US011053917B2

(12) United States Patent
Nayebi et al.

(10) Patent No.: US 11,053,917 B2
(45) Date of Patent: Jul. 6, 2021

(54) OVERBOOSTING TECHNIQUES FOR WIND POWER PLANT

(71) Applicant: VESTAS WIND SYSTEMS A/S, Aarhus N (DK)

(72) Inventors: Kouroush Nayebi, Ikast (DK); Mu Wei, Solbjerg (DK); Dumitru-Mihai Valcan, Langå (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 234 days.

(21) Appl. No.: 15/578,176

(22) PCT Filed: May 23, 2016

(86) PCT No.: PCT/DK2016/050141
§ 371 (c)(1),
(2) Date: Nov. 29, 2017

(87) PCT Pub. No.: WO2016/192731
PCT Pub. Date: Dec. 8, 2016

(65) Prior Publication Data
US 2018/0135597 A1    May 17, 2018

(30) Foreign Application Priority Data
Jun. 3, 2015 (DK) .............................. PA201570339

(51) Int. Cl.
*F03D 7/02* (2006.01)
*F03D 7/04* (2006.01)
*G05B 15/02* (2006.01)

(52) U.S. Cl.
CPC ........... *F03D 7/0284* (2013.01); *F03D 7/048* (2013.01); *G05B 15/02* (2013.01);
(Continued)

(58) Field of Classification Search
CPC ....... F03D 7/0284; F03D 7/048; G05B 15/02; Y02E 10/723; F05B 2270/337;
(Continued)

(56) References Cited

U.S. PATENT DOCUMENTS

2011/0031748 A1   2/2011   Arinaga et al.
2011/0144816 A1*  6/2011   Morjaria ............... F03D 7/0276
                                                        700/287

(Continued)

FOREIGN PATENT DOCUMENTS

EP    2826992 A1    1/2015
WO    2012163355 A1   12/2012
WO    2016192731 A1   12/2016

OTHER PUBLICATIONS

Danish Patent and Trademark Office Search Report for Application No. PA 2015 70339 dated Jan. 19, 2016.

(Continued)

*Primary Examiner* — Kenneth M Lo
*Assistant Examiner* — Jonathan Michael Skrzycki
(74) *Attorney, Agent, or Firm* — Patterson + Sheridan, LLP

(57) ABSTRACT

A method and control arrangement are disclosed for controlling power output of a wind power plant (WPP) including a plurality of wind turbine generators (WTGs). The method includes determining that overboosting is required for the WPP to meet a power demand at the WPP, and determining, for at least a first WTG of the plurality of WTGs, a corresponding amount of overboost capacity. The method further includes generating, based on the determined amount of overboost capacity, control signals causing the first WTG to increase its power output through overboosting to thereby fulfill at least a portion of the power demand.

8 Claims, 9 Drawing Sheets

(52) U.S. Cl.
CPC ............... *F05B 2270/1033* (2013.01); *F05B 2270/1075* (2013.01); *F05B 2270/335* (2013.01); *F05B 2270/337* (2013.01); *Y02E 10/72* (2013.01)

(58) Field of Classification Search
CPC ...... F05B 2270/1075; F05B 2270/1033; F05B 2270/335
See application file for complete search history.

(56) References Cited

U.S. PATENT DOCUMENTS

| | | | |
|---|---|---|---|
| 2012/0104756 A1* | 5/2012 | Beekmann | F03D 7/0224 290/44 |
| 2012/0310426 A1* | 12/2012 | Tarnowski | F03D 7/0272 700/287 |
| 2013/0026759 A1 | 1/2013 | Krueger et al. | |
| 2014/0001758 A1 | 1/2014 | Nielsen | |
| 2014/0013655 A1 | 1/2014 | Southard | |
| 2014/0054893 A1 | 2/2014 | Lindholdt et al. | |

OTHER PUBLICATIONS

International Search Report for Application No. PCT/DK2016/050141 dated Aug. 24, 2016.

* cited by examiner

OVERBOOSTING TECHNIQUES FOR WIND POWER PLANT

BACKGROUND

Technical Field

Embodiments presented in this disclosure generally relate to techniques for operating wind turbine generators to provide an overboosted power output to an operatively connected electrical grid.

Description of the Related Art

Modern power generation and distribution networks increasingly rely on renewable energy sources, such as wind turbine generators. In some cases, the wind turbine generators may be substituted for conventional, fossil fuel-based generators. Beyond merely generating and delivering electrical power, the wind turbine generators are responsible for contributing to grid stability through frequency regulation. However, natural variations in wind conditions can affect the ability of wind turbines to predictably deliver power and regulate grid frequency. Additionally, wind conditions at times may be unsuitable for generating power.

SUMMARY

One embodiment of the present disclosure is a method of controlling power output of a wind power plant (WPP) including a plurality of wind turbine generators (WTGs). The method includes determining that overboosting is required for the WPP to meet a power demand at the WPP, and determining, for at least a first WTG of the plurality of WTGs, a corresponding amount of overboost capacity. The method further includes generating, based on the determined amount of overboost capacity, control signals causing the first WTG to increase its power output through overboosting to thereby fulfill at least a portion of the power demand.

Another embodiment is a control arrangement for controlling power output of a WPP including a plurality of WTGs. The control arrangement includes one or more computer processors, an overboost determination module, and an overboost reference generation module. The overboost determination modules is configured to determine whether overboosting is required for the WPP based on a received demand signal and environmental data, and to generate an overboost set point for the WPP. The overboost reference generation module is configured to receive the overboost set point from the overboost determination module, and to generate, based on determined amounts of overboost capacity for the plurality of WTGs, overboost reference signals signaling one or more of the plurality of WTGs to increase its respective power output through overboosting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
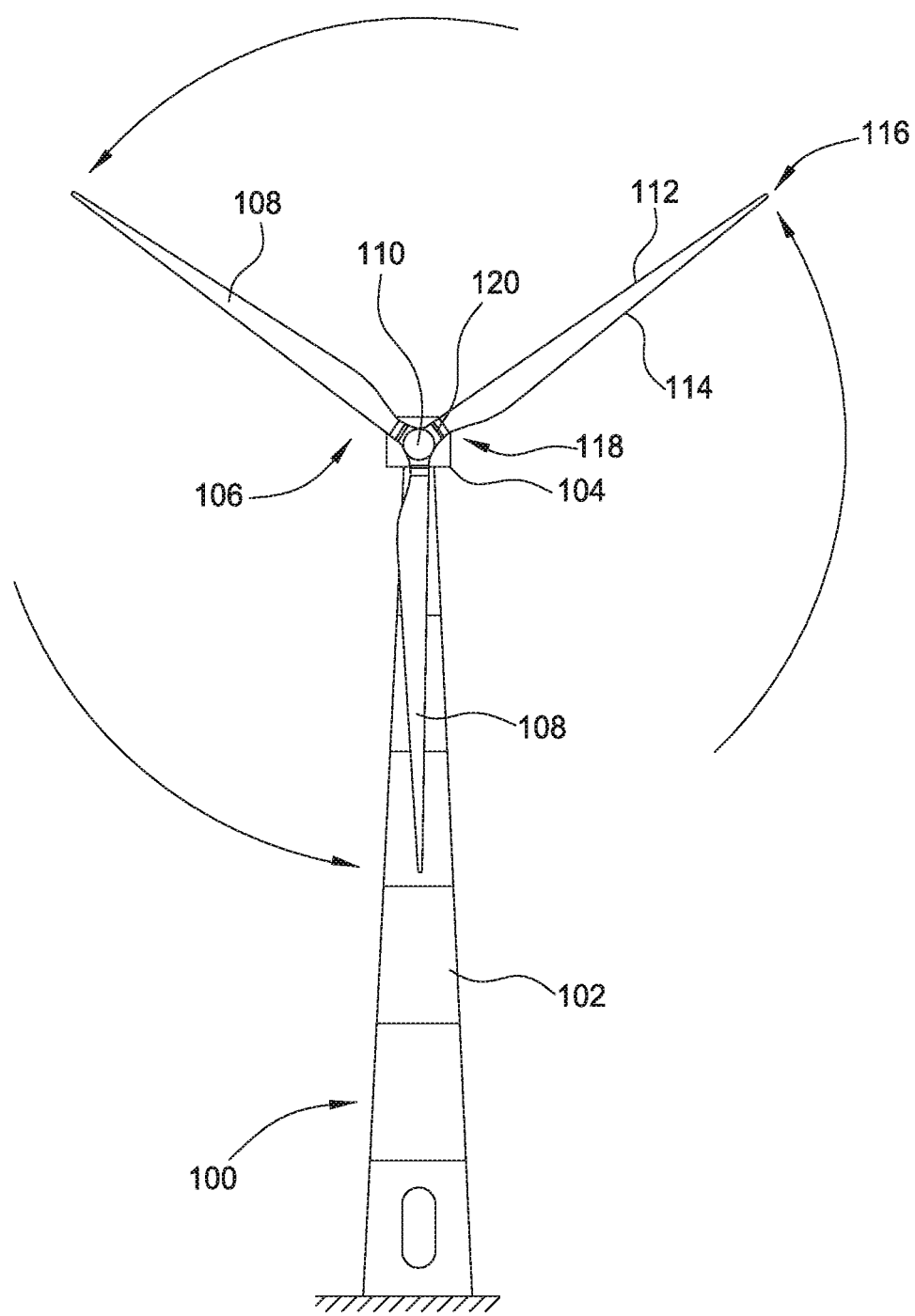
FIG. 1 illustrates a diagrammatic view of a horizontal-axis wind turbine, according to one embodiment.

Embodiments of the disclosure are generally directed to controlling power output of a wind power plant (WPP) through overboosting the power output of one or more wind turbine generators (WTGs). As defined herein, "overboosting" refers to a wind turbine generator producing a power output that exceeds the power output that is available from ambient wind conditions at the wind turbine generator. In various embodiments, the additional power output provided through overboosting may be derived from the kinetic energy of the rotor during its power generation operation. The wind turbine generators may have limited amounts of overboost capacity before their respective rotors are slowed to a minimum allowable speed.

In some embodiments, a wind power plant controller determines that overboosting is required in order to meet a power demand at the wind power plant. The power demand can originate from a source internal or external to the wind power plant and may have relate to any suitable power production requirements, such as providing frequency regulation for a coupled electrical grid, providing a contracted amount of power output at a particular time, etc. The wind power plant controller may determine an overboost set point from the power demand, and control one or more of the wind turbine generators to meet the power demand based on the generators' respective overboost capacity values.

In some embodiments, the determined overboost set point may be used to determine an equalized overboost reference. In one embodiment, the amount of the equalized overboost reference may be applied directly as overboost reference signals for each of the wind turbine generators, so that each wind turbine generator is configured to produce the same amount of overboost power output (e.g., a per capita distribution). Providing an equalized overboost reference for each of the wind turbine generators operates to load each WTG similarly, so that any wear or reduction in operation lifetime caused by the overboosting is distributed substantially equally among the WTGs.

In other embodiments, the amount of overboost indicated by the equalized overboost reference can be adjusted before the overboost reference signals are applied to specific wind turbine generators, with consideration given to the relative amount of overboosting capacity of each wind turbine generator. In one embodiment, the overboost set point for the wind power plant is proportioned among the wind turbine generators based on the relative amounts of overboosting capacity. For example, where the WTGs of a wind power plant have different amounts of overboosting capacity, those WTGs having greater capacity for overboosting are allocated a greater overboosting set point than those WTGs having a lesser capacity. In some cases, a proportional distribution of the plant-level overboosting requirement causes each of the WTGs reach their minimum overboosting capacity at substantially the same time. In other words, the proportional distribution can ensure that the collective overboosting capacity of the wind power plant is entirely exhausted or consumed before the WTGs are shifted to a recovery mode in which overboosting is not available.

In some embodiments, the timing of the control signals causes different wind turbine generators to provide overboosting power output at different times. The wind turbine generators may be arranged into a number of groups, with the different groups providing overboosting output at different times. By time-distributing or staggering the overboosted power outputs, a depressed power output from one or more groups—associated with recovery periods for the WTGs after an overboosting period—may be at least partly mitigated by the overboosted output from another group of WTGs. Such an approach may ensure that the wind power plant output does not decrease to an unacceptable level due to multiple concurrent recovery periods, and may further help to smooth the power provided by the wind power plant to the electrical grid.

FIG. 1 illustrates a diagrammatic view of a horizontal-axis wind turbine 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among other systems to maximize the power generated below rated wind speeds and to reduce the power generated above the rated wind speed to prevent excessive loading on turbine components, e.g., the generator and gearbox. Although the following embodiments are described in the context of wind turbine generators, the embodiments are not limited to such. Indeed, this disclosure may apply to any power generation system capable of providing temporary boosts to power output using the kinetic energy of components such as generator rotors.

Figure 2:
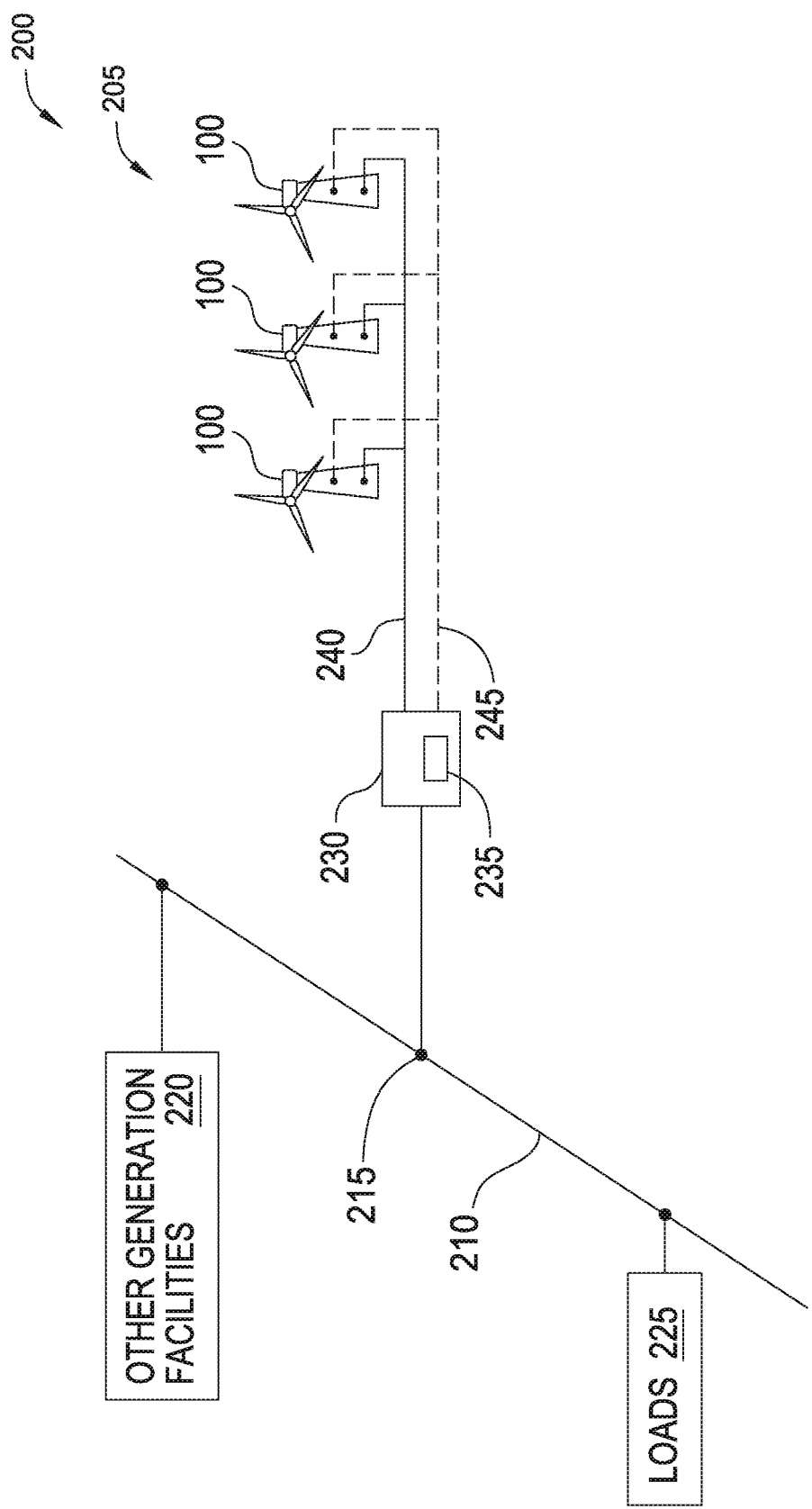
FIG. 2 illustrates a wind power plant operatively connected with an electrical grid, according to one embodiment.

FIG. 2 illustrates a wind power plant operatively connected with an electrical grid, according to one embodiment. The wind power plant 205 includes a plurality of wind turbines 100 operatively connected with an electrical grid 210 at a point of common coupling (PCC) 215. In some embodiments, the wind turbines 100 of the wind power plant 205 are coupled with a substation 230 that includes a wind power plant controller 235. In this case, the output from the substation 230 is coupled with electrical grid 210, and the electrical power generated by the wind turbines 100 is carried on one or more connections 240 to the substation 230. In an alternative embodiment, one or more wind turbines 100 may deliver electrical power directly to the electrical grid 210 without being grouped and/or directed through the substation 230. The substation 230—and specifically wind power plant controller 235—is communicatively coupled with each of the wind turbines 100 (e.g., a wind turbine-level controller) through one or more connections 245.

The electrical grid 210 represents any suitable electrical transmission and/or distribution grids, which may be operated at one or more voltages. The electrical grid 210 generally includes a number of transmission lines, transformers, substations, etc. The electrical grid 210 may be connected with one or more other generation facilities 220, such as one or more additional wind power plants, or one or more different types of generation facilities, such as fossil fuel-based, geothermal, solar, hydroelectric, nuclear, and so forth. The electrical grid 210 is also connected with one or more loads 225, which generally represent industrial, commercial, and/or residential electricity consumers.

Generally, differences in the amount of electrical power generated (e.g., produced by the wind power plant 205 and by the other generation facilities 220) and the amount of electrical power demanded by loads (e.g., loads 225) on an electrical grid cause the grid frequency to deviate from its prescribed or nominal value. Typical values of nominal grid frequency are 60 hertz (Hz) in the US and 50 Hz in Europe. One example of grid frequency deviation occurs when power demand exceeds the power generated—the difference in power can be drawn from the kinetic energy of the wind turbine generator, causing the wind turbine rotor (e.g., rotor 106 of FIG. 1) to slow down and the grid frequency to decrease accordingly. Conversely, when power generation exceeds the amount of power demand, the grid frequency may increase. In some cases, the wind turbine generators may be configured to operate within a predetermined frequency range, such as ±1% of the nominal grid frequency, before disconnecting or performing other regulation procedures to restore the grid frequency to within the predetermined frequency range.

Each wind turbine 100 includes a wind turbine generator (not shown) configured to convert the mechanical energy of the wind turbine rotor 106 into one or more phases of electrical power, which is ultimately delivered to the electrical grid 210 and the loads 225 connected thereto. In various embodiments, the wind turbine generators produce electrical power based on control signals provided by the wind power plant controller 235 and carried across connections 245. The wind turbine generators may also provide feedback signals and other information to the wind power plant controller 235 using the connections 245.

Figure 3:
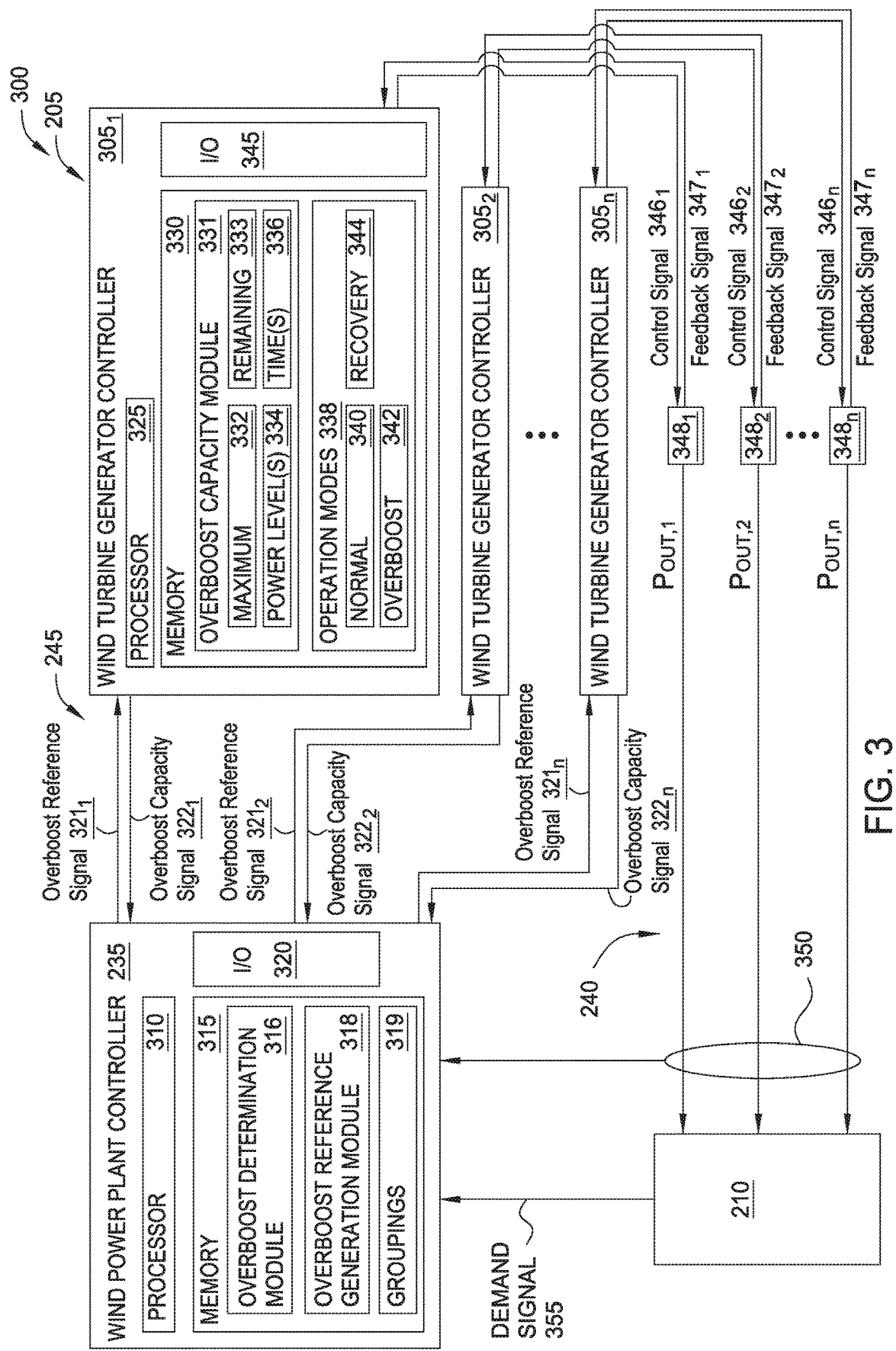
FIG. 3 illustrates a controller arrangement, according to one embodiment.

FIG. 3 illustrates a controller arrangement, according to one embodiment. The controller arrangement 300 is generally disposed at the wind power plant 205, and may be distributed among one or more wind turbines and/or a substation. The wind power plant controller 235 is communicatively coupled with a plurality of wind turbine generator controllers $305_{1-n}$. Each of the wind turbine generator controllers $305_{1-n}$ (generically or collectively, "controller(s) 305") is coupled with a corresponding wind turbine generator $348_{1-n}$ that is configured to supply electrical power $P_{out,1-n}$ to the electrical grid 215. While the controller arrangement 300 is depicted as having a distributed control implementation, an alternative implementation may include all functionality included in a single controller.

The wind power plant controller 235 includes a processor 310, memory 315, and input/output (I/O) 320. Each of the wind turbine generator controllers $305_{1-n}$ may include a processor 325, memory 330, and I/O 345. The processors 310, 325 may have any suitable form, such as a general purpose microprocessor, a controller, an application-specific integrated circuit (ASIC), and so forth. In some embodiments, the processors 310, 325 comprises parts of (or all of) one or more integrated circuits (ICs) and/or other circuitry components. In some embodiments, the processors 310, 325 also comprise electronically-readable instructions, such as firmware code, software code, and the like. In some embodiments, components comprising the processor 310 or 325 are located together, such as being included in a common printed circuit board. Processors 310, 325 are further coupled with respective memories 315, 330. The memories 315, 330 may include a variety of computer-readable media selected for their size, relative performance, or other capabilities: volatile and/or non-volatile media, removable and/or non-removable media, etc. Memories 315, 330 may include registers, cache, random access memory (RAM), storage, etc. Storage included as part of memories 315, 330 may typically provide a non-volatile memory for the processors 310, 325, and may include one or more different storage elements such as Flash memory, a hard disk drive, a solid state drive, an optical storage device, and/or a magnetic storage device.

The processors 310, 325 and memories 315, 330 are further coupled with I/O 320, 345, which may include a number of different I/O adapters including circuitry that supports communication to and from the controllers 235, 305. One non-limiting example of I/O 320, 345 includes network interface cards (NICs) for communicating through the connections 245. Other I/O adapters included in I/O 320, 345 may generally support an end-user's interface with the controllers 235, 305. For example, I/O 320, 345 may include connections for visual/audio/other sensory output devices, as well as connections for input devices such as a keyboard, mouse, touchscreen, etc. In one embodiment, I/O 320, 345 may include graphics cards that include separate processing elements and/or memory.

The controllers 235, 305 may include one or more modules that provide a particular functionality to the controller arrangement 300. The modules may be embodied in hardware or firmware (e.g., included in or coupled with processors 310, 325), as software stored in memories 315, 330, or combinations thereof. Furthermore, the modules may be implemented solely within one of the controllers 235, 305 and/or distributed across different controllers. Although modules are depicted as being included in a particular controller of the controllers 235, 305, in other embodiments one or more modules may be included in other controller(s).

The wind power plant controller 235 includes an overboost determination module 316 and an overboost reference generation module 318. The overboost determination module 316 operates to determine whether overboosting is required of any of the wind turbine generators of the wind power plant. In some embodiments, the overboost determination module 316 receives a demand signal 355 representing an amount of power demand for the wind power plant. The demand signal 355 may be provided externally, such as by a controller outside of the wind power plant 205 that is coupled with the electrical grid 210. Alternatively, the demand signal 355 may be generated internally to the wind power plant 205, for example according to predetermined, contracted amounts of power output and/or frequency regulation. The predetermined amounts may be stored in or otherwise accessible by the wind power plant controller 235.

The overboost determination module 316 may further assess the environmental and operational conditions for the wind turbine generators $348_{1-n}$ to determine whether "normal" operation (that is, generating power using current wind conditions and without overboosting) of the wind turbine generators 348 is adequate to meet the power demand. If the current wind conditions, considered collectively across the wind power plant, are not sufficient to meet the power demand, the overboost determination module 316 may determine how much overboosting is required from the wind power plant to meet the power demand. The determined overboosting amount may be provided to the overboost reference generation module 318 in any suitable form. In one example, the amount of overboosting required is provided to the overboost reference generation module 318 as an overboost set point for the wind power plant.

The overboost reference generation module 318 receives the overboosting amount from the overboost determination module 316. The overboost reference generation module 318 may further receive overboost capacity signals $322_{1-n}$ from the controllers $305_{1-n}$ to assess the relative amounts of overboost capacity that are available for each of the WTGs 348. For example, some of the WTGs 348 could be operating at (or near) a minimum allowed rotational speed corresponding to little or no overboost capacity, as the rotor has very little kinetic energy available to spare. The relative amounts of overboost capacity may be used to determine which WTGs of the wind power plant 205 are suitable or unsuitable for providing an overboosted output, as well as how to distribute the overboosting responsibility among those suitable WTGs.

In some embodiments, the wind power plant controller 235 controls each of the WTGs $348_{1-n}$ individually in controlling the overboosted output of the wind power plant 205. In some embodiments, the wind power plant controller 235 can control the WTGs $348_{1-n}$ according to one or more groups of the WTGs. Memory 315 includes groupings 319 that represent current and/or future (scheduled) groups of the WTGs $348_{1-n}$, each group including one or more of the WTGs 348. In some embodiments, groupings 319 can be updated dynamically, e.g., based on the operating mode and/or relative overboost capacity of the WTGs 348 in each of the groups. In some embodiments, the groupings 319 are selected to mitigate the effects of power output reduction following a period of overboosting output. For example, following overboosting a WTG 348 may require a recovery period in which some of the wind energy at the WTG is not output to the electrical grid, but used to increase the rotor speed to increase and thereby "recover" the overboosting capacity of the WTG. The recovery period may correspond to a power output level that is depressed from a nominal power output level of the WTG.

It can be advantageous to distribute the recovery periods of WTGs 348 of a wind power plant 205 so that a large number of recovery periods do not occur simultaneously. For example, if too many of the WTGs 348 are producing a less-than-nominal output power due to their recovery periods, the collective output of the wind power plant 205 may be unacceptably low. Accordingly, in some embodiments, the overboosting and/or recovery periods of individual (or groups of) WTGs 348 of the wind power plant 205 may be aligned so that when a certain WTG or group has a depressed power output due to a recovery period, another WTG or group may concurrently provide an overboosted output that at least partly compensates for the depressed power output. Such an approach may help to smooth the power provided by the wind power plant to the electrical grid. Further aspects of the timing are discussed with respect to FIG. 4.

Each controller 305 includes an overboost capacity module 331 that is generally configured to determine and/or update amounts of overboost capacity for its associated wind turbine generator 348, based on current environmental and/or operating conditions. As shown, the overboost capacity module 331 includes values for a maximum overboost capacity (maximum 332) and a remaining overboost capacity (remaining 333). The maximum overboost capacity may represent a theoretical maximum calculated based on the current wind conditions at the wind turbine, the current wind power production of the wind turbine generator, the speed of the rotor, etc. The remaining overboost capacity may reflect the effects of current and/or previous overboosting operations, in some cases indicating what portion of the maximum 332 is still available to be used for overboosting. The overboost capacities (maximum 332, remaining 333) may be provided in any suitable form. For example, overboost capacities may be represented as a power quantity (e.g., 30 kilowatts (kW)), an energy quantity (e.g., 30 kW for 30 seconds, or 900 kilojoules (kJ)), a time quantity (e.g., 30 seconds), a voltage or current quantity, and so forth. In some cases, overboost capacities may be defined relative to nominal or other ratings of the wind turbine generator (e.g., 10% of the nominal power output). The overboost capacities may specify a power level component (power level(s) 334) and/or a time component (time(s) 336).

The controllers 305 include a number of distinct operation modes 338 for the corresponding wind turbine generators 348. For example, a normal 340 mode of operation for the wind turbine generator corresponds to power generation using available wind energy. An overboost 342 mode of operation can be selected when additional power output is required beyond what is available through wind energy. A recovery 344 mode of operation can be selected following a period in the overboost 342 mode. In the recovery 344 mode, the overboost capacity of the wind turbine generator 348 may be recovered. For example, overboost capacity may be increased in the recovery 344 mode by operating the wind turbine generator at a lower power output than is available from the current wind conditions, using the power difference to increase the rotor speed.

Based on the determined relative amounts of overboost capacity, the overboost reference generation module 318 provides overboost reference signals $321_{1-n}$ to the WTG controllers $305_{1-n}$. Though not explicitly depicted, the wind power plant controller 235 also provides suitable reference signals to the WTG controllers $305_{1-n}$ corresponding to "normal," non-overboosted (that is, based on available wind energy) operation. In one embodiment, the wind power plant controller 235 provides at least two different reference signals to each wind turbine generator 348—one corresponding to wind-based power generation, and one overboost reference signal 321. Controllers $305_{1-n}$ may send control signals $346_{1-n}$ to operate the wind turbine generators 348 to produce output power $P_{out,1-n}$ based on the received reference signal(s) $321_{1-n}$.

In some embodiments, the overboost reference generation module 318 is configured to provide control signals 346 to cause different wind turbine generators 348 to provide overboosting power output at different times. For example, the different times can correspond to the groupings 319— e.g., a first group of WTGs receives control signals 346 and begins overboosting before a second group of WTGs begins overboosting based on the corresponding control signals 346. In some embodiments, the timing is determined by the overboost reference generation module 318 in order to use the overboosting capability of one WTG or group to compensate for a depressed power output of a second WTG or group undergoing a recovery period.

The control arrangement 300 may also include one or more feedback paths for the controllers 235, 305. In some embodiments, the same or separate connections used for transmitting control signals 346 to the WTGs 348 may also be used to transmit feedback signals $347_{1-n}$ from the WTGs 348 to the controllers 305. The feedback signals 347 may include operational information, such as the power, voltage, and/or current output by the corresponding WTG 348, an operational status of the WTG 348 or its components, environmental information such as wind conditions, and other information suitable for updating power generation reference signals.

In some embodiments, the outputs provided by the WTGs 348 may be measured and provided to the wind power plant controller 235. For example, the measured power output $P_{out,1-n}$ may be determined using sensors 350 coupled with the wind power plant controller 235. In some cases, the wind power plant controller 235 may compare the output power— or, more specifically, the portion of the output power corresponding to the overboost power production—with the overboost reference signal 321 to determine if any difference (or error) exists. If there is any error, the wind power plant controller 235 may adjust the overboost reference signal 321 to achieve the desired output power value. In some embodiments, the wind power plant controller 235 may use a proportional-integral-derivative (PID) controller or suitable alternative to adapt the overboost reference signal 321 based on the error values.

Figure 4:
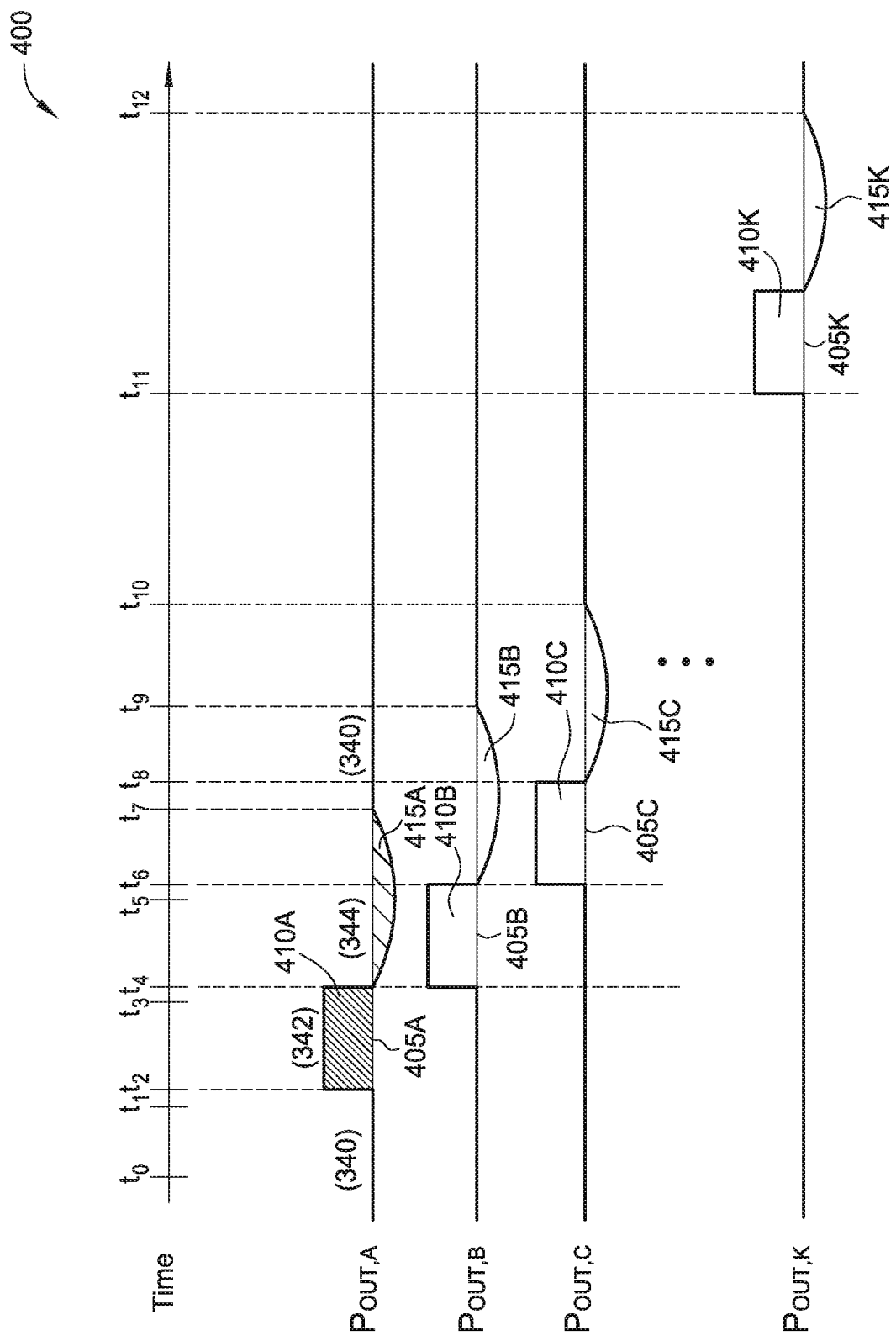
FIG. 4 illustrates an exemplary timing of overboost power output of a wind power plant, according to one embodiment.

FIG. 4 illustrates an exemplary timing of overboost power output of a wind power plant, according to one embodiment. Generally, chart 400 reflects different control signals provided to different WTGs or groups of WTGs using an overboost reference generation module.

In chart 400, several power outputs $P_{out,\ A-K}$ are depicted with respect to time. Each of the K power outputs can represent an individual wind turbine generator or can represent groups of one or more wind turbine generators. For simplicity, the power outputs will be described as groups A, B, C, . . . , K of WTGs. As discussed above, the groupings of WTGs may be dynamically updated, such that particular WTGs can be included in more than one group over time. For example, a first WTG could be included in group A (represented by $P_{out,\ A}$) and group K ($P_{out,\ K}$).

At time $t_0$, the power outputs provided by groups A-K correspond to respective nominal power outputs 405A-405K. This may correspond to a normal 340 operation mode of each of the WTGs. Though depicted similarly in chart 400, the relative levels of the nominal power outputs 405A-405K can differ between the based on the number of WTGs included in each group, the individual ratings of the WTGs, and so forth.

At a time $t_1$, the wind power plant controller transmits an overboost reference signal to the WTGs of a first group (group A) that causes those WTGs to begin overboosting. This is reflected as the increase in $P_{out, A}$ beginning at time $t_2$. The time between $t_1$ and $t_2$ can reflect delays in communication, processing, and/or response to the overboost reference signals. Between time $t_2$ and time $t_4$, the WTGs of group A provide an overboosting output represented by area 410A. This may correspond to operating the WTGs in an overboost 342 mode. The size of area 410A relates to the collective overboost capacities of the group A WTGs, such as a sum of the maximum overboost capacity of each WTG. While the overboosting output is depicted as a simple step function in the power output $P_{out, A}$, the person of ordinary skill will recognize that the overboosting output may have any suitable alternative shape consistent with the overboost capacity of the WTGs. For example, the overboost output level could be higher during a shorter period of time (i.e., $t_4$ occurs earlier) to maintain a constant size of the area 410A. In another example, the overboost output level may be time-varying, such as including continuous or incremental increases and/or decreases.

As discussed above, the wind power plant controller may receive overboost capacity signals from the individual WTG controllers that indicate a remaining amount of overboost capacity for the WTG. As the overboost capacity of each of the group A WTGs is gradually consumed between times $t_2$ and $t_4$, the wind power plant controller may use the remaining amount(s) of overboost capacity to determine or estimate when the overboosting output will cease—in other words, determining when time $t_4$ will occur. Alternatively, the individual WTG controllers may report a remaining overboost time to the wind power plant controller.

Beginning at time $t_4$, the WTGs of group A cease producing overboost power and enter a recovery 344 mode to recover the expended overboost capacities. During this time—which is represented by area 415A—the power output $P_{out, A}$ decreases below nominal power output 405A, as a portion of the nominal power output is used to increase rotor speeds and thereby recover the overboost capacities of the WTGs. Following a complete recovery of the overboost capacity for group A, at time $t_7$ the wind power plant controller causes the WTGs of group A to resume normal 340 mode operations.

Based on the determined time $t_4$, the wind power plant controller may transmit overboost reference signals to the WTGs of a second group (group B) such that the group B WTGs begin overboosting concurrently with the depressed power output of the group A WTGs. In this way, the overboosting of the group B WTGs may at least partly mitigate the depressed power output, and in some cases provide a smoother power output from the wind power plant as a whole. As shown, the wind power plant controller transmits an overboost reference signal to the group B WTGs at time $t_3$, which accounts for the possible communication and processing delays. Similar to the control of the group A WTGs, the overboosting output of the group B WTGs (area 410B) is depicted as a step function, however any suitable shape is possible consistent with the collective overboost capacity of the group B WTGs. In one embodiment, the shape of the group B overboosting output may be set by the wind power plant controller to closely compensate for the depressed portion of the group A power output, providing a relatively smooth collective output from the wind power plant. At time $t_6$, the overboost output from the group B WTGs ceases, and the group B WTGs enter a recovery mode to restore the expended overboost capacity.

The sequence of transmitting overboost reference signals may continue in a similar cascading fashion for subsequent WTG groups C through K. At time $t_5$, the wind power plant controller transmits overboost reference signals to the WTGs of group C causing overboosting to begin at time $t_6$. The overboost output from group C (represented by area 410C) may at least partially compensate for the depressed power outputs of group A and group B. At time $t_7$, the group A WTGs have completed recovery of the overboost capacity, and return to a normal operating mode. At time $t_8$, the overboosting from group C ceases and the group C WTGs enter a recovery mode to restore the expended overboost capacity. At times $t_9$ and $t_{10}$, the group B and group C WTGs respectively complete recovery of their overboost capacity and return to normal operation. At time $t_{11}$, the group K WTGs begin overboosting. The overboost capacity is expended and recovered, and the group K WTGs are returned to normal operation at time $t_{12}$.

In one embodiment, the WTG groups A-K might reflect all of the WTGs of the wind power plant (that is, those WTGs having an overboosting capacity) being used one time to provide overboosting. In other words, a first WTG provides overboosting as part of group A; in this case, the first WTG would not be used again in groups B through K. Following completion of the sequence of groups A-K, the wind power plant controller may repeat the sequence of groups A-K, or the power plant controller may make adjustments to the sequence and/or the composition of the groups. For example, the wind power plant controller may rearrange the WTGs into different groupings, which in some cases results in a greater or lesser number of groups (relative to K) during subsequent operation. The rearranging of WTGs may be based on updated information to the wind power plant controller, such as changes to overboosting capacity, changes to overboosting requirements due to an increased power demand, and so forth.

In other embodiments, the WTG groups are updated with greater frequency, such that certain WTGs could be included more than once within the groups A-K shown in chart 400. For example, say a second WTG is included in group A. Whether the WTGs of group A expend their overboost capacity in sequence or concurrently, the second WTG will have expended its overboost capacity by about time $t_4$. In some cases, once the second WTG's overboost capacity is fully recovered, the second WTG is available to be rearranged into another group. In one example, the recovery period operates to restore overboost capacity of the group A WTGs concurrently, so that each of the group A WTGs are fully recovered at about time $t_7$. Here, the second WTG is available to be rearranged into a group that begins overboosting output any time following time $t_7$, such as group K (begins at time $t_{11}$).

In another example, the wind power plant controller recovers overboost capacity of the group A WTGs sequentially, so that certain WTGs of group A have a full recovery of overboosting capacity prior to time $t_7$. In this case, if the second WTG has a full recovery prior to, say, time $t_5$, the second WTG is available to be rearranged into a group that begins overboosting output any time following time $t_5$, such as group C (begins at time $t_6$).

The previous examples assume that a particular WTG fully recovers its overboost capacity before being available for rearranging by the wind power plant controller. However, in other embodiments, it may be possible to rearrange a WTG after partially expending or partially recovering its overboost capacity.

Figure 5:
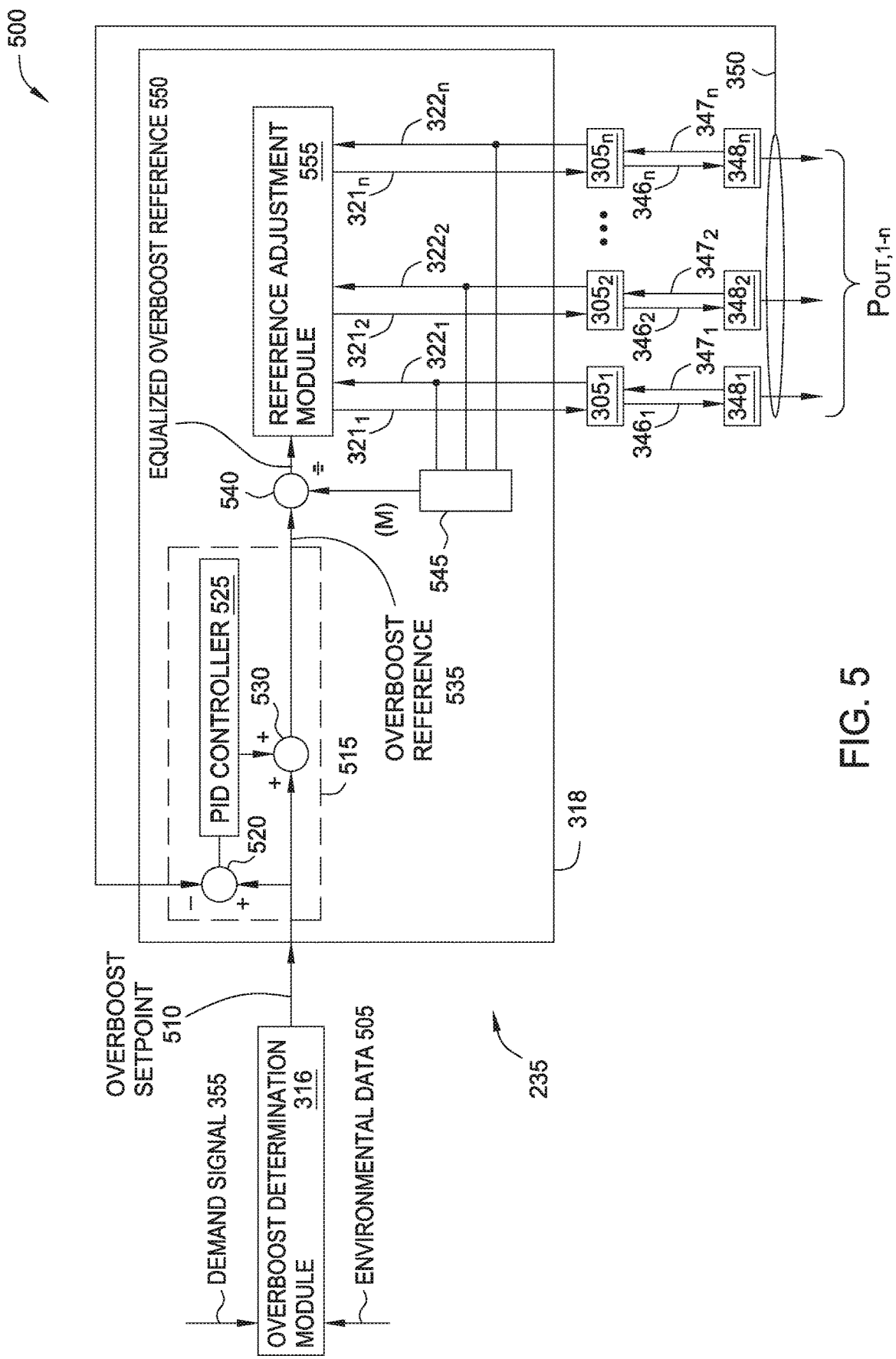
FIG. 5 illustrates operation of an exemplary controller arrangement, according to one embodiment.

FIG. 5 illustrates operation of an exemplary controller arrangement, according to one embodiment. More specifically, the controller arrangement 500 shows one possible configuration of a portion of the controller arrangement 300.

The overboost determination module 316 may receive a demand signal 355 as discussed above. The overboost determination module 316 may also receive environmental data 505, which may include determined wind conditions at one or more of the wind turbine generators 348. In some embodiments, the environmental data 505 may be measured using sensors at the wind turbine generators 348, and transmitted from the controllers 305. In other embodiments, the environmental data 505 may be determined through estimates and/or forecasting.

If the overboost determination module 316 determines that the current environmental and/or operational conditions are not suitable to generate sufficient power to meet the power demand indicated by demand signal 355, the overboost determination module 316 indicates that overboosting is required for the wind power plant. Accordingly, the overboost determination module 316 provides an overboost set point 510 indicating an amount of overboosted power required from the wind power plant.

The overboost reference generation module 318 receives the overboost set point 510 and performs processing to generate the overboost reference signals 321 used to control the WTGs 348. An overboost reference 535 may be derived from the received overboost set point 510. In some cases, the overboost reference 535 may be the same as the overboost set point 510.

In some embodiments, the overboost reference generation module 318 includes an error correction module 515 that is configured to adjust the value of the overboost reference 535 based on a measured or determined overboost power output (e.g., using sensors 350). The error correction module 515 includes a subtractor 520 configured to output the difference of the overboost set point 510 and the measured/determined overboost power output. The difference value may be processed through a PID controller 525, which generates an output based on the difference and that is designed to mitigate the difference through subsequent control loop iterations. In alternate embodiments, other suitable types of controllers may be substituted for PID controller 525, such as one or more P, PI, PD, and/or PID controllers. The overboost set point 510 and the output of the PID controller 525 are inputs to an adder 530, which generates the overboost reference 535.

The overboost reference 535 is provided to a divider 540, which produces an equalized overboost reference 550 from the overboost reference 535. Logic 545 generates the value of the divisor for the divider 540. In some embodiments, logic 545 is configured to determine a set of M (of N) wind turbine generators $348_{1-n}$ that have a predetermined amount of overboost capacity. The predetermined amount in some cases may be any overboost capacity greater than zero, and in some cases may be a predetermined minimum amount. In one embodiment, the overboost capacity is a maximum overboost capacity of the wind turbine generator. In another embodiment, the overboost capacity is a remaining overboost capacity of the wind turbine generator. The logic 545 receives the overboost capacity signals $322_{1-n}$ and passes the value of M (in this case, a count) to the divider 540, and the equalized overboost reference 550 is the overboost reference divided by M.

In this case, the equalized overboost reference 550 represents a per capita distribution of the overboost reference—that is, each wind turbine generator 348 having suitable overboost capacity (i.e., the set of M) is responsible for providing an equal amount of overboost output power. For example, say the overboost reference is 60 kW (that is, 60 kW of overboost output power is required to be generated by the wind power plant) and four (4) wind turbine generators of the wind power plant have an overboost capacity of 100 kW each. The equalized overboost reference in this case would be 15 kW (60 kW divided by 4) assigned or allocated to be generated by each of the four WTGs. And because each of the four WTGs has adequate overboost capacity (100 kW>15 kW), no further distributions of the overboost reference should be required.

The overboost allocation distribution may be updated periodically or upon determining a change to the composition of the set of M wind turbine generators. Continuing the previous example, say one of the four WTGs no longer has a remaining overboost capacity due to providing the equalized 15 kW overboost output power for a period of time. If the overboost reference remains 60 kW, this amount may be divided among the remaining three WTGs to yield a new equalized overboost reference of 20 kW (60 kW divided by 3) per WTG. In an alternative example, say another WTG from the wind power plant recently exited a recovery mode and now has available overboost capacity. If there are now five (5) WTGs with an overboost capacity, the new equalized overboost reference may be 12 kW (60 kW divided by 5) per WTG.

In other embodiments, logic 445 is configured to determine a total amount of overboost capacity for the wind power plant by aggregating the overboost capacity of the wind turbine generators 348. The logic 545 receives the overboost capacity signals $322_{1-n}$ and passes the value of M (in this case, a sum of the overboost capacity of the wind turbine generators 348) to the divider 540, and the equalized overboost reference 550 is the overboost reference divided by M.

The equalized overboost reference 550 may undergo further processing at the reference adjustment module 555 in order to produce the overboost reference signals $321_{1-n}$ or other control signals for the wind turbine generators 348. In some cases, the processing can be as simple as adjustment or scaling, e.g., from one value or range of values to another. In one embodiment, the processing performed in reference adjustment module 555 includes multiplying the equalized overboost reference 550 by the amount of overboost capacity for the particular wind turbine generator 348. This approach represents a proportional distribution of the overboost reference. For example, say the overboost reference is 60 kW. A first WTG (WTG1) has a remaining overboost capacity of 50 kW, a second WTG (WTG2) has a remaining overboost capacity of 30 kW, and a third WTG (WTG3) has a remaining overboost capacity of 20 kW. The logic 545 determines that the wind power plant has a total remaining overboost capacity of 100 kW (that is, 50+30+20 kW). Accordingly, the equalized overboost reference 550 in this case is calculated as 0.6 kW/kW (that is, 60 kW/100 kW overboost capacity). Reference adjustment module 555 multiplies the equalized overboost reference (0.6 kW/kW) by the respective overboost capacity values to determine the overboost reference signals for the WTGs. Accordingly, the reference adjustment module 550 produces overboost reference signals $321_{1-n}$ allocating 30 kW to WTG1 (0.6 kW/kW×50 kW overboost capacity), 18 kW to WTG2 (0.6 kW/kW×30 kW), and 12 kW to WTG3 (0.6 kW/kW×20 kW).

In addition to the examples provided above, the reference adjustment module 555 may be configured to perform additional processing, which will be apparent in the discussion of methods 600, 700, 800, and 900 below. Furthermore, alternative embodiments of the controller arrangement 500, 300 do not require a step of determining an equalized overboost reference 550 before generating overboost reference signals 321 used to control the wind turbine generators 348. In such a case, the overboost reference signals 321 can be determined in any suitable manner consistent with the various overboost control techniques described herein (such as the arrangement of WTGs into groups and the time distribution of overboosting and recovery periods).

Figure 6:
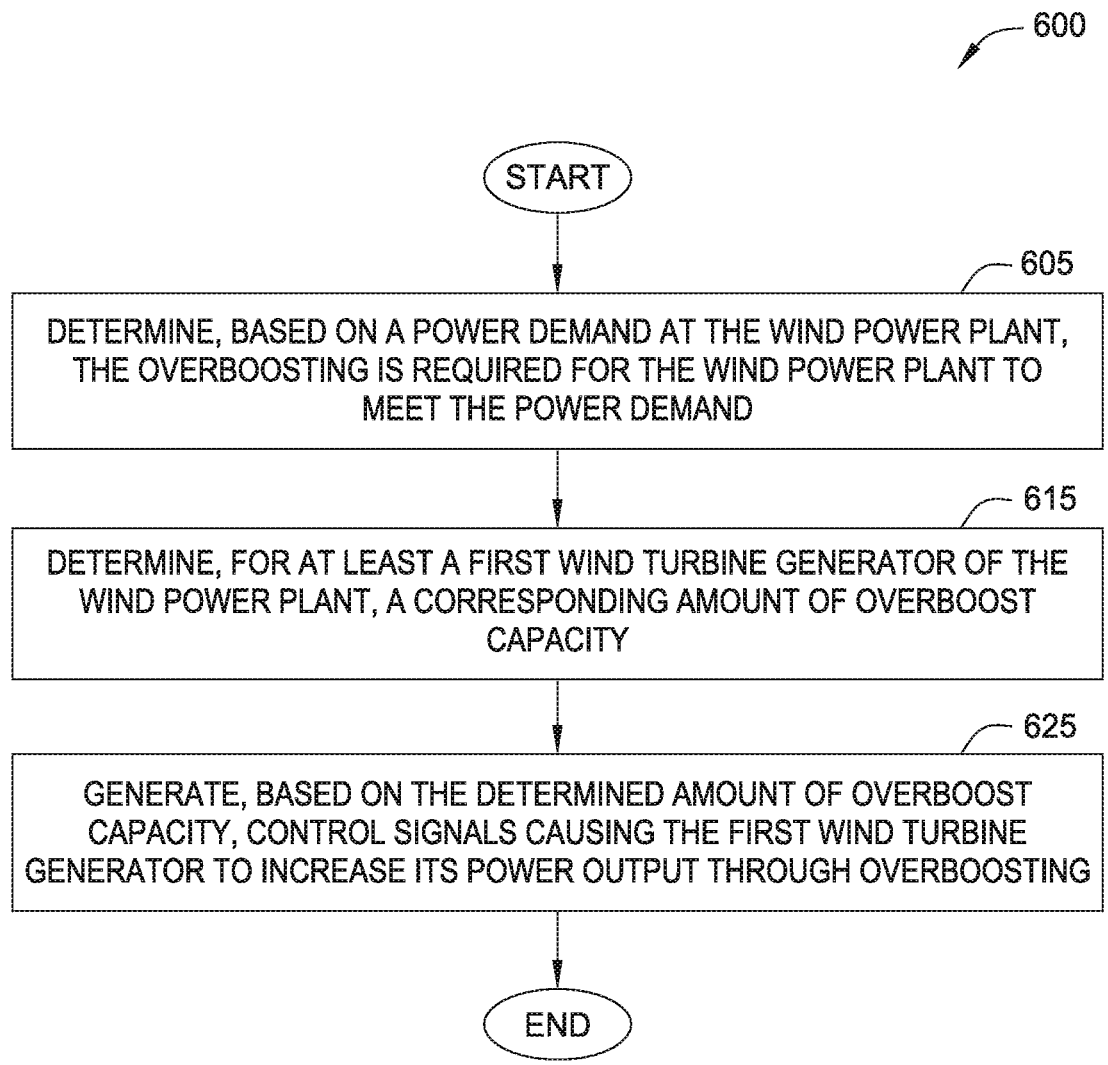
FIG. 6 is a block diagram of a method of controlling power output of a wind power plant, according to one embodiment.

FIG. 6 is a block diagram of a method of controlling power output of a wind power plant, according to one embodiment. Generally, method 600 may be performed using one or more controllers of the control arrangement 300 described above.

Method 600 begins at block 605, where the control arrangement determines that overboosting is required for the wind power plant to meet a power demand. In one embodiment, a wind power plant-level controller makes this determination. The determination may be based on a received power demand signal as well as environmental data (including wind conditions) and operational data for the wind turbine generators of the wind power plant. If an analysis of the environmental data and operational data indicate that the wind power plant cannot generate the amount of power demanded using just the available wind energy, the control arrangement determines that overboosting is required. The control arrangement may further determine the amount of overboosting that is required in any suitable form, such as an overboosting set point for the wind power plant.

At block 615, the control arrangement determines an amount of overboost capacity for at least a first WTG of the wind power plant. In one embodiment, the overboost capacity is determined using a wind turbine-level controller. The control arrangement may determine a maximum overboost capacity that is based on wind conditions at the WTG and represents a theoretical maximum, and/or a remaining overboost capacity that reflects an amount of overboost capacity available from the maximum overboost capacity. In some cases, the control arrangement may determine that certain WTGs of the wind power plant do not have an overboost capacity, based on similar calculations or based on an operating mode of the WTG (for example, a recovery mode during which overboost capacity is restored).

At block 625, the control arrangement generates, based on the determined amount(s) of overboost capacity, control signals causing the first WTG to increase its power output through overboosting, and thereby fulfilling at least a portion of the power demand. In some embodiments, generating control signals may include generating an equalized overboost reference, and generating overboost reference signals for the WTGs based on the equalized overboost reference. In some embodiments, overboost capacities for a plurality of WTGs of the wind power plant are determined, and the control signals are used to allocate the overboost requirement on a per capita basis or proportional to the relative overboost capacity amounts. Method 600 ends following completion of block 625.

Figure 7:
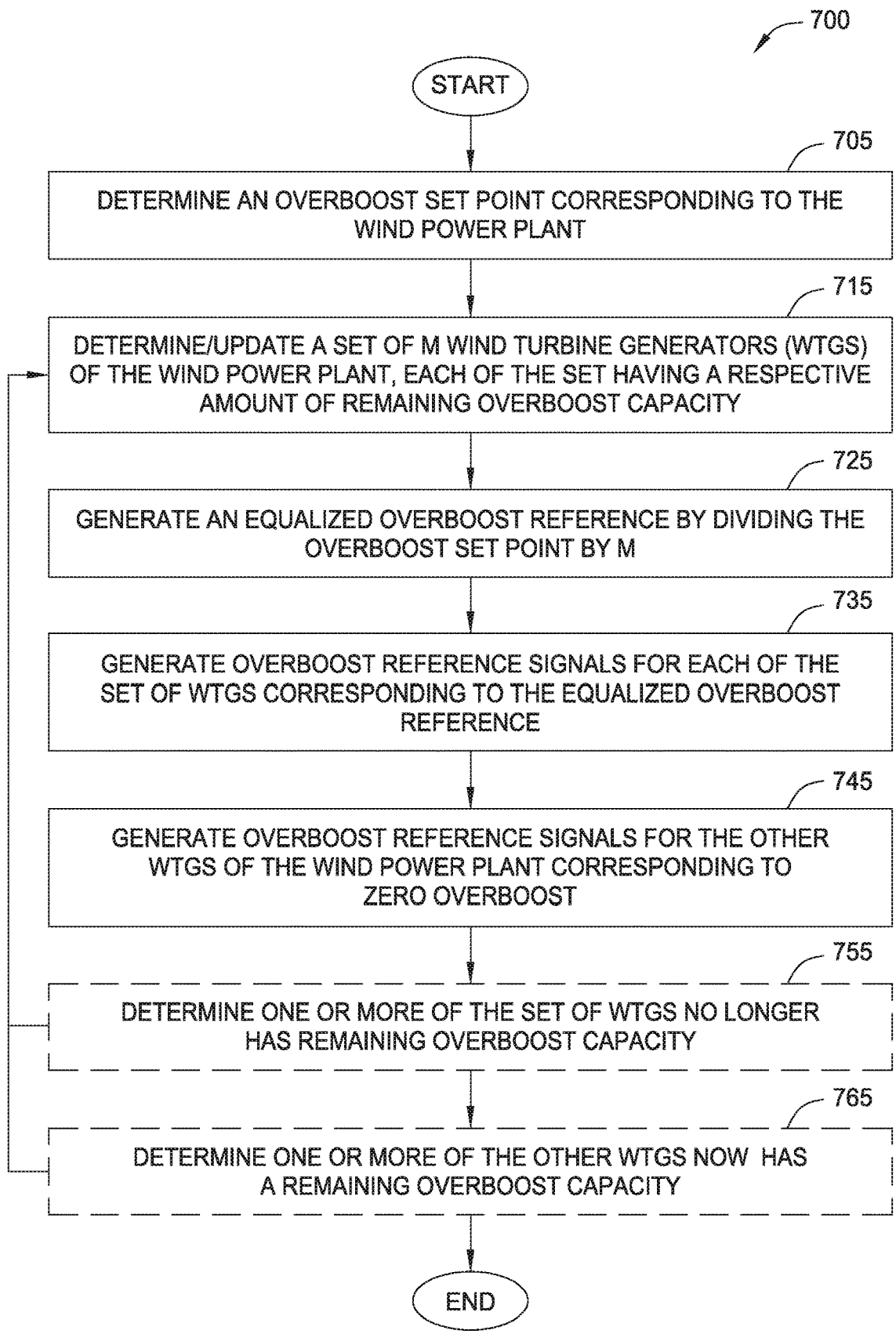
FIG. 7 is a block diagram of a method of controlling power output of a wind power plant, according to one embodiment.

FIG. 7 is a block diagram of a method of controlling power output of a wind power plant, according to one embodiment. Method 700 may be performed using one or more controllers of the control arrangement 300 described above, and provides an example of a more specific implementation of method 600.

Method 700 begins at block 705, where the control arrangement determines an overboost set point corresponding to the wind power plant. In some cases, the overboost set point generally corresponds to the difference between the power demand and the wind power plant's level of power generation based on the current wind conditions.

At block 715, the control arrangement determines a set of M wind turbine generators (out of N wind turbine generators in the wind power plant) with each having a respective amount of remaining overboost capacity. The amount of remaining overboost capacity in some cases may be any overboost capacity greater than zero, and in some cases may be a predetermined threshold amount.

At block 725, the control arrangement generates an equalized overboost reference by dividing the overboost set point by the count M (where M≤N). In this case, the equalized overboost reference represents a per capita distribution of the overboost reference among the wind turbine generators. At block 735, the control arrangement generates overboost reference signals for each of the set of WTGs corresponding to the equalized overboost reference. At block 745, the control arrangement generates overboost reference signals for the other (N-M) WTGs of the wind power plant not included in the set. The overboost reference signals correspond to a zero overboost power output from the other WTGs. Alternatively, the control arrangement may disable the overboost function of the other WTGs.

At optional block 755, the control arrangement determines one or more of the set of WTGs no longer has remaining overboost capacity. This may be due to current or previous overboost operations using the overboost capacity, and/or changes to the environmental or operating conditions for the WTG. The method returns to block 715 to update the set of M wind turbine generators and repeat the subsequent blocks with the updated set.

At optional block 775, the control arrangement determines one or more of the other WTGs not included in the set now has a remaining overboost capacity. This may be due to restoring overboost capacity through operating the WTG in the recovery mode, and/or changes to the environmental or operating conditions for the WTG. The method returns to block 715 to update the set of M wind turbine generators and repeat the subsequent blocks with the updated set. The method 700 ends following completion of one of blocks 745, 755, and 765.

Figure 8:
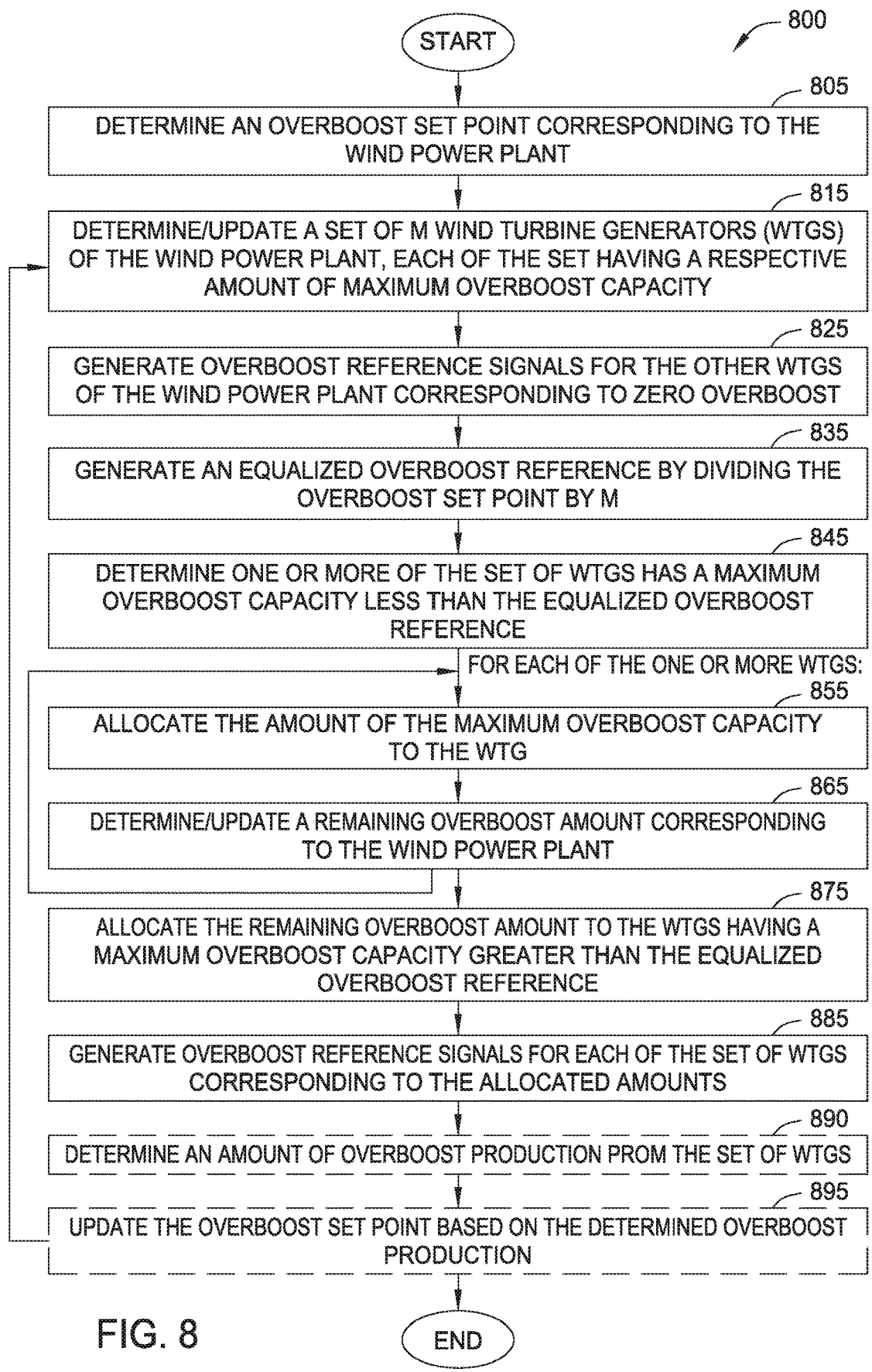
FIG. 8 is a block diagram of a method of controlling power output of a wind power plant, according to one embodiment.

FIG. 8 is a block diagram of a method of controlling power output of a wind power plant, according to one embodiment. Method 800 may be performed using one or more controllers of the control arrangement 300 described above, and provides an example of a more specific implementation of method 600.

Method 800 begins at block 805, where the control arrangement determines an overboost set point corresponding to the wind power plant. In some cases, the overboost set point generally corresponds to the difference between the power demand and the wind power plant's level of power generation based on the current wind conditions.

At block 815, the control arrangement determines a set of M wind turbine generators (out of N wind turbine generators in the wind power plant; M≤N) with each having a respective amount of maximum overboost capacity. The amount of maximum overboost capacity in some cases may be any overboost capacity greater than zero, and in some cases may be a predetermined threshold amount.

At block 825, the control arrangement generates overboost reference signals for the other WTGs of the wind power plant not included in the set (N-M). The overboost reference signals correspond to a zero overboost power output from the other WTGs. Alternatively, the control arrangement may disable the overboost function of the other WTGs.

At block 835, the control arrangement generates an equalized overboost reference by dividing the overboost set point by M. In this case, the equalized overboost reference represents a per capita distribution of the overboost reference among the wind turbine generators.

At block 845, the control arrangement determines that one or more of the set of WTGs has a maximum overboost capacity that is less than the equalized overboost reference. Generally, this indicates that the equalized overboost reference must be modified for the one or more WTGs in order for the wind power plant to meet the overall power demand. At block 855, and for each of the determined one or more WTGs, the control arrangement allocates the amount of the maximum overboost capability to the WTG. In some embodiments, the control arrangement may allocate an amount less than the maximum overboost capacity, allowing a predetermined margin to account for possible changes in the environmental or operational conditions. At block 865, the control arrangement determines a remaining overboost amount—which has yet to be allocated to a particular WTG—corresponding to the wind power plant. The method returns to block 855 if any more of the determined one or more WTGs are remaining, and updates the remaining overboost amount as needed.

At block 875, the control arrangement allocates the remaining overboost amount to the WTGs of the set having a maximum overboost capacity that is greater than the equalized overboost reference. The remaining overboost may be distributed among the WTGs in any suitable way, such as equally divided or proportional to the amount of overboost capacity beyond the equalized overboost reference.

At block 885, the control arrangement generates overboost reference signals for each of the set of WTGs corresponding to the allocated amounts determined in blocks 855 and 875.

At optional block 890, the control arrangement determines an amount of overboost production from the set of WTGs. The overboost production may be determined from measurements of the power output of the WTGs, or of the wind power plant collectively. At optional block 895, the control arrangement updates the overboost set point based on the determined overboost production. For example, if a difference or error exists between the set point and the amount of overboost produced by the wind power plant, the control arrangement may update the overboost set point to mitigate the error and achieve the desired overboost power output. In some embodiments, the control arrangement may use one or more P, PD, PI, and/or PID controllers. The method returns to block 815 to update the set of M WTGs based on the updated overboost set point, and to repeat the subsequent blocks with the updated set of WTGs. The method ends following completion of one of blocks 885, 890, and 895.

Figure 9:
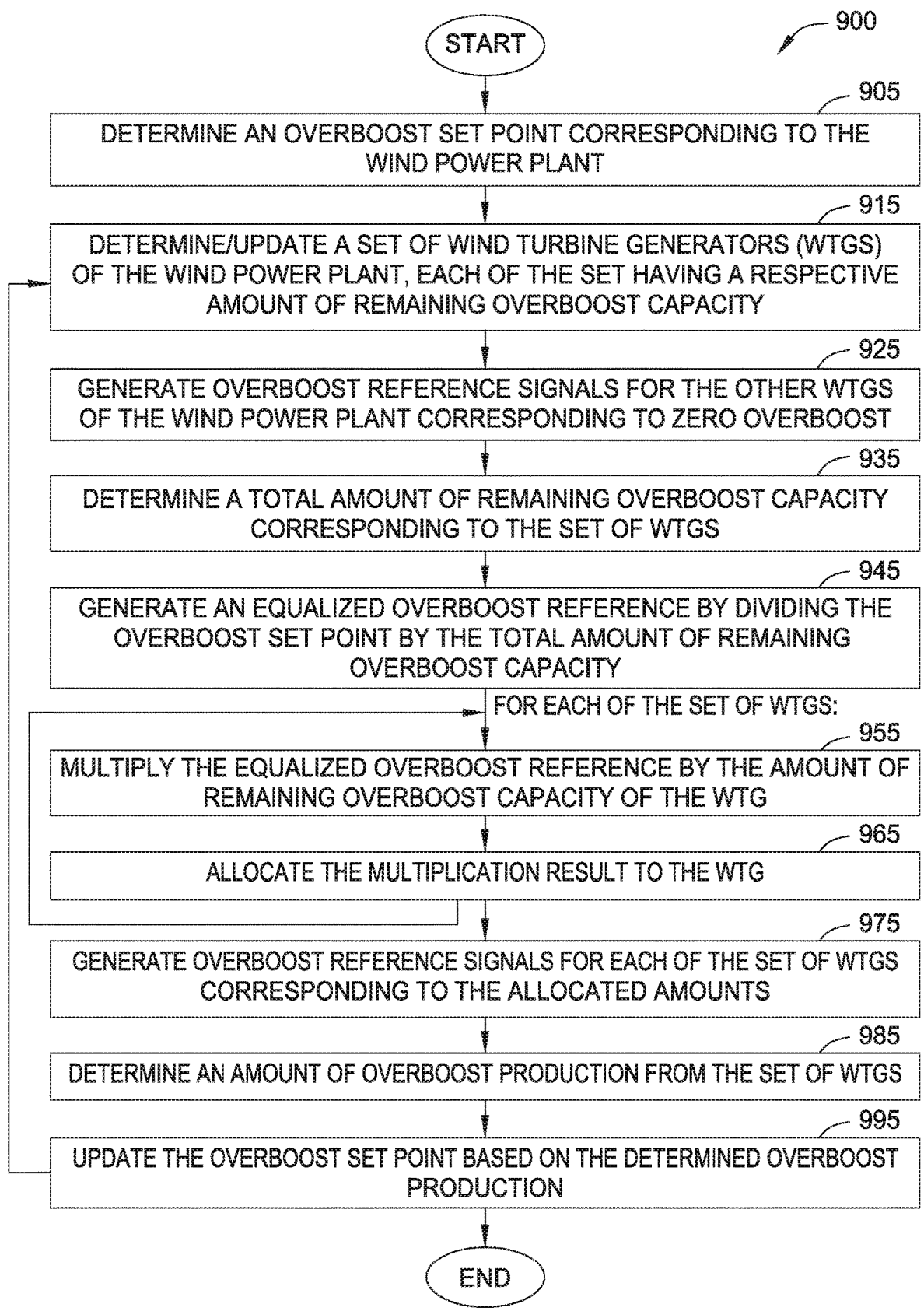
FIG. 9 is a block diagram of a method of controlling power output of a wind power plant, according to one embodiment.

FIG. 9 is a block diagram of a method of controlling power output of a wind power plant, according to one embodiment. Method 900 may be performed using one or more controllers of the control arrangement 300 described above, and provides an example of a more specific implementation of method 600.

Method 900 begins at block 905, where the control arrangement determines an overboost set point corresponding to the wind power plant. In some cases, the overboost set point generally corresponds to the difference between the power demand and the wind power plant's level of power generation based on the current wind conditions.

At block 915, the control arrangement determines a set of M wind turbine generators (out of N wind turbine generators in the wind power plant; M≤N) with each having a respective amount of remaining overboost capacity. The amount of remaining overboost capacity in some cases may be any overboost capacity greater than zero, and in some cases may be a predetermined threshold amount.

At block 925, the control arrangement generates overboost reference signals for the other WTGs of the wind power plant not included in the set (N-M). The overboost reference signals correspond to a zero overboost power output from the other WTGs. Alternatively, the control arrangement may disable the overboost function of the other WTGs.

At block 935, the control arrangement determines a total amount of remaining overboost capacity corresponding to the set of WTGs. At block 945, the control arrangement generates an equalized overboost reference by dividing the overboost set point by the total amount of remaining overboost capacity.

At block 955, and for each of the set of WTGs, the control arrangement multiplies the equalized overboost reference by the amount of remaining overboost capacity for the particular WTG. At block 965, the multiplication result is allocated by the control arrangement to the WTG. The method returns to block 955 if any more of the WTGs of the set are remaining. In this case, the equalized overboost reference represents a proportional distribution of the overboost reference among the wind turbine generators based on the remaining overboost capacity.

At block 975, the control arrangement generates overboost reference signals for each of the set of WTGs corresponding to the allocated amounts determined in blocks 965.

At block 985, the control arrangement determines an amount of overboost production from the set of WTGs. The overboost production may be determined from measurements of the power output of the WTGs, or of the wind power plant collectively. At block 995, the control arrangement updates the overboost set point based on the determined overboost production. For example, if a difference or error exists between the set point and the amount of overboost produced by the wind power plant, the control arrangement may update the overboost set point to mitigate the error and achieve the desired overboost power output. In some embodiments, the control arrangement may use one or more P, PD, PI, and/or PID controllers. The method returns to block 915 to update the set of M WTGs based on the updated overboost set point, and to repeat the subsequent blocks with the updated set of WTGs. The method ends following completion of one of blocks 975, 985, and 995.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of controlling power output of a wind power plant (WPP) including a plurality of wind turbine generators (WTGs), the method comprising:
   determining that overboosting is required for the WPP to meet a power demand at the WPP, wherein overboosting comprises producing, using kinetic energy from a wind turbine component, a power output that exceeds a power output that is available from ambient wind conditions;

determining a set of WTGs of the plurality of WTGs, wherein each WTG of the set of WTGs has a respective amount of maximum overboost capacity;

generating an equalized overboost reference by dividing an overboost set point of the WPP by a count of WTGs included in the set of WTGs;

upon determining that a respective amount of maximum overboost capacity for a first subset of WTGs of the set of WTGs is less than the equalized overboost reference:
  allocating the determined amounts of maximum overboost capacity to the respective WTGs of the first subset, and
  updating a remaining overboost amount corresponding to the WPP;

upon determining that a respective amount of maximum overboost capacity for a second subset of WTGs of the set of WTGs is greater than the equalized overboost reference, allocating the updated remaining overboost amount to the respective WTGs of the second subset, wherein WTGs of the first subset of WTGs are not included in the second subset of WTGs; and generating control signals that cause each WTG of the set of WTGs to increase its power output through overboosting by the corresponding allocated amount.

2. The method of claim 1, wherein the maximum overboost capacity is based on wind conditions at the set of WTGs and represents a theoretical maximum amount of overboost, and the remaining overboost amount is based on an amount of overboost capacity available from the maximum overboost capacity.

3. The method of claim 1, further comprising:
determining one or more WTGs of the set of WTGs no longer has a remaining overboost capacity;
updating the set of WTGs of the plurality of WTGs by removing, from the set of WTGs, the one or more WTGs no longer having a remaining overboost capacity; and
updating the equalized overboost reference based on an updated count of WTGs included in the updated set of WTGs.

4. The method of claim 1, wherein each WTG of the set of WTGs has a respective amount of remaining overboost capacity, wherein generating the equalized overboost reference comprises dividing the overboost set point by a total of the amounts of remaining overboost capacity for the set of WTGs, the method further comprising:
for each WTG of the set of WTGs:
  multiplying the equalized overboost reference by the amount of remaining overboost capacity of the WTG; and
  allocating the multiplication result to the WTG,
wherein generating the control signals comprises generating overboost reference signals signaling each WTG of the set of WTGs to increase its power output through overboosting by the corresponding allocated multiplication result amount.

5. The method of claim 1, further comprising:
determining, for at least a second WTG of the plurality of WTGs, a corresponding amount of overboost capacity; and
generating, based on the determined amount of overboost capacity, control signals causing the second WTG to increase its power output through overboosting to thereby fulfill at least a portion of the power demand, wherein the control signals for the second WTG cause the second WTG to increase its power output through overboosting corresponding to a recovery period of the first WTG.

6. A control arrangement for controlling power output of a wind power plant (WPP) including a plurality of wind turbine generators (WTGs), the control arrangement comprising:
one or more computer processors;
an overboost determination module configured to:
  determine whether overboosting is required for the WPP based on a received demand signal and environmental data, wherein overboosting comprises producing, using kinetic energy from a wind turbine component, a power output that exceeds a power output that is available from ambient wind conditions, and
  generate an overboost set point for the WPP;
an overboost reference generation module configured to:
  receive the overboost set point from the overboost determination module,
  determine a set of WTGs of the plurality of WTGs, wherein each WTG of the set of WTGs has a respective amount of maximum overboost capacity,
  generate an equalized overboost reference by dividing the overboost set point by a count of WTGs included in the set of WTGs,
  upon determining that a respective amount of maximum overboost capacity for a first subset of WTGs of the set of WTGs is less than the equalized overboost reference:
    allocate the determined amounts of maximum overboost capacity to the respective WTGs of the first subset, and
    update a remaining overboost amount corresponding to the WPP,
  upon determining that a respective amount of maximum overboost capacity for a second subset of WTGs of the set of WTGs is greater than the equalized overboost reference, allocate the updated remaining overboost amount to the respective WTGs of the second subset, wherein WTGs of the first subset of WTGs are not included in the second subset of WTGs, and
  generate control signals that cause each WTG of the set of WTGs to increase its power output through overboosting by the corresponding allocated amount.

7. The control arrangement of claim 6,
wherein at least one of the computer processors, the overboost determination module, and the overboost reference generation module are included in a WPP controller communicatively coupled with a plurality of WTG controllers, each WTG controller comprising at least one of the computer processors,
wherein the WTG controllers are each configured to:
  provide a respective overboost capacity signal to the WPP controller; and
  receive a respective overboost reference signal from the WPP controller.

8. The control arrangement of claim 6, wherein each WTG of the set of WTGs has a respective amount of remaining overboost capacity, wherein generating the equalized overboost reference comprises dividing the overboost set point by a total of the amounts of remaining overboost capacity for the set of WTGs, the overboost reference generation module further configured to:
for each WTG of the set of WTGs:

multiply the equalized overboost reference by the amount of remaining overboost capacity of the WTG; and allocate the multiplication result to the WTG, wherein the overboost reference signals signal each WTG of the set of WTGs to increase its power output through overboosting by the corresponding allocated multiplication result amount.

\* \* \* \* \*